(12) United States Patent
Meier et al.

(10) Patent No.: US 11,855,903 B2
(45) Date of Patent: Dec. 26, 2023

(54) METHOD AND COMPUTER PROGRAM FOR SENDING A DATA PACKET, METHOD AND COMPUTER PROGRAM FOR RECEIVING A DATA PACKET, COMMUNICATION UNIT AND MOTOR VEHICLE WITH COMMUNICATION UNIT

(71) Applicant: Volkswagen Aktiengesellschaft, Wolfsburg (DE)

(72) Inventors: Alexander Meier, Wolfsburg (DE); Olaf Krieger, Lostau (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 624 days.

(21) Appl. No.: 17/052,277

(22) PCT Filed: Apr. 12, 2019

(86) PCT No.: PCT/EP2019/059367
§ 371 (c)(1),
(2) Date: Nov. 2, 2020

(87) PCT Pub. No.: WO2019/211076
PCT Pub. Date: Nov. 7, 2019

(65) Prior Publication Data
US 2021/0144099 A1 May 13, 2021

(30) Foreign Application Priority Data
May 2, 2018 (DE) ..................... 10 2018 206 780.5

(51) Int. Cl.
*H04L 47/62* (2022.01)
*H04L 12/40* (2006.01)
(Continued)

(52) U.S. Cl.
CPC .... *H04L 47/6225* (2013.01); *H04L 12/40163* (2013.01); *H04L 12/413* (2013.01);
(Continued)

(58) Field of Classification Search
CPC ............. H04L 67/568; H04L 12/40163; H04L 12/413; H04L 47/245; H04L 47/365;
(Continued)

(56) References Cited

U.S. PATENT DOCUMENTS 6,038,217 A * 3/2000 Lyles ................. H04Q 11/0478
370/429
6,564,267 B1 * 5/2003 Lindsay ................. H04L 69/166
370/465
(Continued)

FOREIGN PATENT DOCUMENTS

DE 102018206780 A1 11/2019 ........... H04L 12/865
EP 1193938 A1 4/2002 ............. H04L 12/28
(Continued)

OTHER PUBLICATIONS

Gehrsitz, Thomas et al., "Analysis of Medium Access Protocols for Power Line Communication Realizing In-Car Networks," IEEE 80th Vehicular Technology Conference, 7 pages, Sep. 14, 2014.
(Continued)

*Primary Examiner* — Jenee Holland
(74) *Attorney, Agent, or Firm* — Slayden Grubert Beard PLLC

(57) ABSTRACT

The present invention relates to a method for sending a data packet from a first communication unit of a communication system via a transmission channel that is shared with at least one further communication unit. The method comprises determining a current access priority for the shared transmission channel by the first communication unit, wherein the current access priority is directed towards data currently
(Continued)

transmitted over the transmission channel. The data packet is segmented into packet segments, wherein the packet segments have a priority value which corresponds to a priority value of the data packet. The method also comprises sending the packet segments from the first communication unit via the shared transmission channel, wherein the packet segments are sent successively depending on the priority value and the current access priority.

16 Claims, 3 Drawing Sheets

(51) Int. Cl.
| | | |
|---|---|---|
| *H04L 12/413* | (2006.01) | |
| *H04L 47/24* | (2022.01) | |
| *H04L 47/36* | (2022.01) | |
| *H04L 47/6275* | (2022.01) | |
| *H04L 67/568* | (2022.01) | |
| *H04L 47/60* | (2022.01) | |

(52) U.S. Cl.
CPC .......... *H04L 47/245* (2013.01); *H04L 47/365* (2013.01); *H04L 47/6275* (2013.01); *H04L 67/568* (2022.05); *H04L 2012/40273* (2013.01)

(58) Field of Classification Search
CPC ............. H04L 47/6275; H04L 47/6225; H04L 2012/40273
See application file for complete search history.

(56) References Cited

U.S. PATENT DOCUMENTS

| | | | | |
|---|---|---|---|---|
| 6,826,186 | B1* | 11/2004 | Dittia ...................... | H04L 45/24 370/395.31 |
| 7,899,052 | B1* | 3/2011 | Hao ....................... | H04L 49/351 370/392 |
| 9,001,654 | B2* | 4/2015 | Diachina ................. | H04L 47/10 370/231 |
| 10,291,680 | B2* | 5/2019 | Radha ................. | H04L 65/1101 |
| 10,419,367 | B2* | 9/2019 | Bower ................ | H04L 49/9005 |
| 2002/0041592 | A1* | 4/2002 | Van Der Zee ............ | H04L 9/40 370/389 |
| 2002/0061027 | A1* | 5/2002 | Abiru ...................... | H04L 47/50 370/413 |
| 2003/0110286 | A1* | 6/2003 | Antal ................... | H04L 47/2408 709/236 |
| 2004/0081093 | A1* | 4/2004 | Haddock ................. | H04L 47/10 370/230 |
| 2005/0249117 | A1* | 11/2005 | Gerkins .............. | H04L 47/2441 370/235 |
| 2006/0153228 | A1* | 7/2006 | Stahl ........................ | H04L 47/13 370/252 |
| 2007/0008884 | A1* | 1/2007 | Tang .......................... | H04L 9/40 370/230 |
| 2008/0071924 | A1 | 3/2008 | Chilukoor et al. ........... | 709/240 |
| 2008/0084824 | A1* | 4/2008 | Chin ...................... | H04L 47/215 370/252 |
| 2008/0117913 | A1* | 5/2008 | Tatar .................... | H04L 49/1546 370/392 |
| 2008/0267204 | A1* | 10/2008 | Hall ....................... | H04L 49/101 370/412 |
| 2011/0119761 | A1* | 5/2011 | Wang ................... | H04L 63/1458 726/23 |
| 2014/0189140 | A1* | 7/2014 | Takahashi ............. | G06F 16/172 709/231 |
| 2014/0341032 | A1 | 11/2014 | Thaler ........................... | 370/235 |
| 2016/0373362 | A1 | 12/2016 | Cheng et al. ................. | 370/235 |
| 2017/0149674 | A1 | 5/2017 | Verma et al. ................. | 370/230 |
| 2019/0327033 | A1* | 10/2019 | Huang ................... | H04L 1/1835 |
| 2020/0099446 | A1* | 3/2020 | Riggins, II ............ | H04L 1/1874 |
| 2021/0114616 | A1* | 4/2021 | Altman ............ | H04N 21/41422 |
| 2022/0124048 | A1* | 4/2022 | Keller .................... | H04L 51/226 |
| 2023/0033298 | A1* | 2/2023 | Peng ................... | H04L 41/5022 |

FOREIGN PATENT DOCUMENTS

| | | | |
|---|---|---|---|
| WO | 2003/063428 A1 | 7/2003 | ............. H04L 12/56 |
| WO | 2019/211076 A1 | 11/2019 | ............. H04L 12/40 |

OTHER PUBLICATIONS

German Office Action, Application No. 102018206780.5, 7 pages, dated Nov. 20, 2018.
International Search Report and Written Opinion, Application No. PCT/EP2019/059367, 25 pages.

* cited by examiner

METHOD AND COMPUTER PROGRAM FOR SENDING A DATA PACKET, METHOD AND COMPUTER PROGRAM FOR RECEIVING A DATA PACKET, COMMUNICATION UNIT AND MOTOR VEHICLE WITH COMMUNICATION UNIT

CROSS-REFERENCE TO RELATED APPLICATIONS

This application claims priority to German Patent Application No. DE 10 2018 206 780.5, filed on May 2, 2018 with the German Patent and Trademark Office. The contents of the aforesaid Patent Application are incorporated herein for all purposes.

TECHNICAL FIELD

The present invention relates to methods and computer programs for sending data packets from a first communication unit of a communication system via a transmission channel that is shared with at least one further communication unit. The invention furthermore relates to a corresponding method and computer programs for receiving data packets, to communication units, as well as to a motor vehicle with a communication unit.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Communication units can be connected to each other in a communication system via a transmission channel, for example by means of an Ethernet link with a data rate of 10 Mbit/s. In doing so, a transmission channel or communication channel that is jointly used or shared by several communication units (a so-called "shared medium") can be used. Only a maximum of one communication unit can send one data packet in each case via a shared communication transmission channel at one point in time. Communication units may be for example vehicle units such as sensors and control units in an electrical system of a vehicle.

To prevent collisions of messages on the transmission channel that would arise with the simultaneous transmission or write access of several participants on the transmission medium, a collision prevention mechanism is needed. For use in for example a 10 Mbit/s automotive Ethernet, a PLCA (PLCA: PHY (PHY: physical layer) level collision avoidance) method is known. In this method, each participant has a dedicated time window in which only he has authorized access to the shared transmission channel and may send data thereon. If the sending process is concluded or the participant has not started sending within a predetermined time period, the next participant is granted authorized access to the transmission channel. After all participants have had the opportunity of sending a frame or a data packet, the communication cycle starts again. It can thereby be ensured that all communication participants are equally entitled to send data packets via the shared transmission channel.

In some communication systems, a prioritization for sending data packets with respect to real time requests may be necessary so that important data can be sent before less important data, and less important data in this case do not occupy the shared transmission channel.

A communication unit could sequentially send data packets of differing priority that are to be sent once the communication unit receives an authorized access for the shared transmission channel. In situations in which another communication unit possesses authorized access, a certain time delay may occur until data packets of the communication unit can be sent via the transmission channel. For example, the other communication unit can send a comparatively large data packet, such as 1500 bytes large, and the communication unit could receive authorized access at the earliest following the conclusion of sending the large data packet, for example after too long a delay or latency period for real-time requests of an application or function.

Sending data packets of several communication units via a shared transmission channel can occur in the context of distributed systems, for example in vehicles or motor vehicles, as well as in the sector of general automation, or in a sector of home automation.

SUMMARY

An object exists to provide an improved approach for the communication (sending and receiving) of data packets via a transmission channel shared by several communication units.

This object is solved by the subject matter of the independent claims. Embodiments of the invention are discussed in the dependent claims and the following description.

The details of one or more embodiments are set forth in the accompanying drawings and the description below. Other features will be apparent from the description, drawings, and from the claims.

DESCRIPTION

Figure 1:
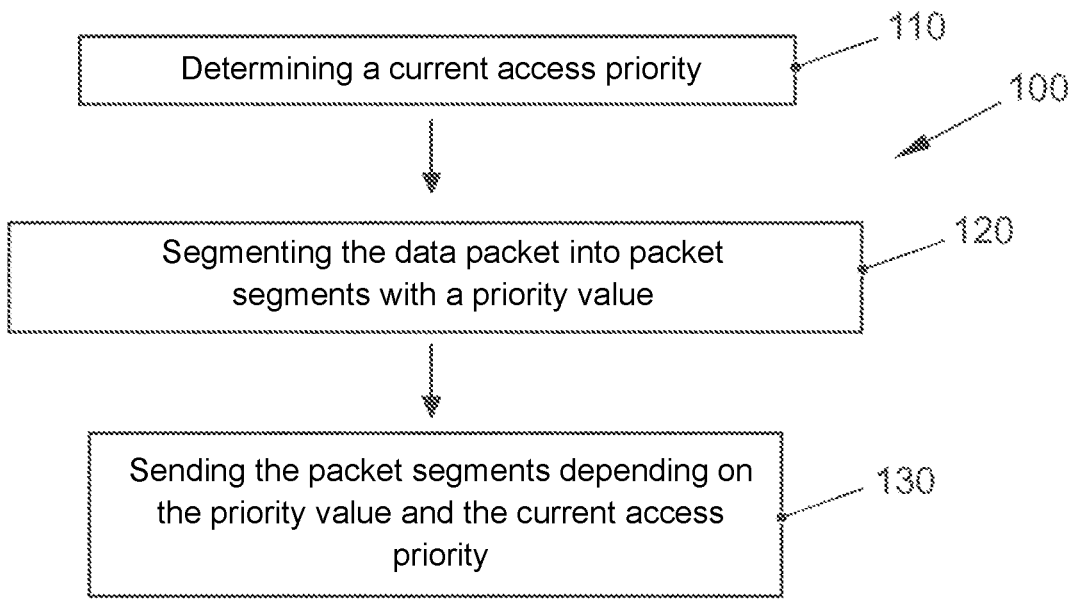
FIG. 1 shows a schematic flow chart of an example of a priority-based method for sending a data packet by using segmentation.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In a first exemplary aspect, a method is proposed for sending a data packet from a first communication unit of a communication system via a transmission channel that is shared with at least one further communication unit. Access or authorized access is provided to the communication units on the shared communication channel according to a round-robin method. Each communication unit receives authorized access to the shared communication channel once within a cycle or round robin in order to be able to send data.

According to the exemplary method, a current access priority for the shared transmission channel is determined by the first communication unit, wherein the current access priority is directed towards data currently transmitted over the transmission channel. For example, data packets from other communication units can be received by the first communication unit via the shared transmission channel. By reading out these data packets, the priority possessed by the respective data packets can be determined. For example, a priority of a data packet last transmitted via the transmission channel can represent the current access priority. In one example, a data packet with a priority of 5 is sent by a second communication unit, and the first communication unit establishes the current access priority with the value of 5 based on the data packet of priority 5. For example, data packets of priority 3 that are to be sent are at the first communication unit, and the first communication unit could delay sending the data packets until the current access priority for the shared transmission channel has at least dropped to the value of 3, for example after the second communication unit stops sending data packets of priority 5. In other words, the first communication unit for example only sends data when their priority is at least as high as the current access priority, wherein the current access priority can vary depending on the situation or time. The current access priority may for example be established continuously during a round robin or once per round robin.

According to an example, however, while the second communication unit sends the data packet of priority 5, a data packet to be sent, of for example priority 7, may arrive at the first communication unit that for example should be sent as fast as possible as a result of real-time requests. If the data packet from the second communication unit is relatively large, for example possesses a size of 1500 bytes, the first communication unit may for example only receive authorized access for the shared transmission channel according to other methods once the sending of the large data packet from the second communication unit has ended so that a latency can occur. As a consequence, for example, real-time requests may not be able to be fulfilled in some situations.

One possibility could for example be to always generate and process very small messages or data packets by software in all communication units participating in the round robin method. However, this may lead to a high load on a processor of the communication units since for example routines for sending and receiving messages must be executed much more frequently than would be the case with large messages.

Consequently, segmenting the data packet to be sent into packet segments is proposed according to the exemplary method, wherein the packet segments have a priority value that corresponds to a priority value of the data packet. In other words, a segmenting method with consideration of priority is proposed. For example, packet segments of the data packet having a priority of 7 also have a priority value of 7. Segmenting can for example be implemented or executed in hardware, for example in a network controller of the communication unit, and segmentation of the messages to be sent can therefore be enabled efficiently. For example, packet segments can have a predetermined or adjustable maximum size; for example, the maximum size is 16 bytes, 32 bytes, 64 bytes or 128 bytes. Accordingly, the size and therefore a duration required to send data by a communication unit per cycle may be reduced and/or limited by the segmentation. The maximum size may for example be selected depending on a transmission speed, or respectively a temporal granularity of the transmission channel, for example of a data bus. Establishing the maximum size may yield the benefit that for example a maximum time delay or latency can be defined until the next issuing of an authorized access for a communication unit. For example, the maximum size may be selected so that the most time-critical communication unit of a communication system can always send data packets according to predetermined real-time requests.

To send the entire packet, the generated packet segments are transmitted from the first communication unit via the shared transmission channel, wherein the packet segments are sent successively depending on the priority value and the current access priority. For example, a particular packet segment may be sent via the shared transmission channel per granted authorized access. In other words, the data packet is sent in numerous sending processes instead of a single sending process, wherein the number depends on the overall size of the data packet. For example, first all packet segments may be generated and then sent. Alternatively it is possible to send initial packet segments while the remaining packet segments of the data packet are being generated. This may yield the benefit that for example a time until a packet segment is sent may be reduced.

The benefit of successively sending packet segments, or segments of segmented data packets or messages, can be that large data packets cannot block the transmission channel for long periods. This makes it possible to reduce potential latency periods for high-priority data packets to be sent. A benefit may be to always be able to satisfy real-time requests within a communication system through a suitable selection of the segment size, or the size of packet segments.

In some exemplary embodiments, the first communication unit and the second communication unit can each send data packets of an equivalent priority, for example the priority 5, and of the same size. For example, the data packets are each segmented into ten packet segments. The first and the second communication unit may then each alternatingly send packet segments successively until the entire data packet is sent, for example after ten sending cycles.

In other exemplary embodiments, a data packet of priority 7 that is to be sent may arrive at the second communication unit, for example after sending the fifth packet segment of priority 5. The second communication unit may interrupt the sending of the packet segments of the data packet of priority 5 and send packet segments of the segmented data packet of priority 7. Since the first communication unit does not send the data packet of priority 5 all at once, it is possible for the first communication unit to also interrupt sending after a first part of the data packet is sent (after a number of packet segments less than an overall number of packet segments of the data packet), for example when, because of a received packet segment or data packet, for example the first packet segment of priority 7, the first communication unit determines on the transmission channel that the current access priority is higher than the priority of the data packets that it is to send.

In some embodiments, the sending of the data packet is interrupted when the access priority exceeds the priority value of the packet segments. The previously performed segmenting of the data packet into packet segments may yield the benefit that the sending of the data packet may be interrupted at any time after sending a packet segment. This may minimize an arising latency period when sending high-priority data packets over the shared transmission channel.

In some embodiments, the sending of the data packet is continued when the value of the access priority falls to a value that is the same or less than the priority value of the packet segments. For example, the interrupted sending of the data packet may then be continued (by sending missing packet segments) when other communication units do not have any data packets of a higher priority to be sent via the shared transmission channel. For example, after it has sent all packet segments of the data packet of priority 7, the second communication unit may continue sending the packet segments of the data packet of priority 5 that has not yet been completely sent. The first communication unit may then determine that the access priority of the shared transmission channel has again fallen to the value of 5, and other communication units therefore do not have any data packets that are more time-critical. As of this point in time (for example after receiving the first packet segment of priority 5 from the second communication unit), the first communication unit may continue with the successive sending of the data packet of priority 5. The benefit of this may be that sending packet segments may immediately be resumed once the access priority of the shared transmission channel has fallen to the priority value of the packet segments so that all communication units with data packets of an equivalent priority value are equally granted authorized access with a minimum time delay.

In some embodiments, the data packet corresponds to a data packet with a first priority value, and the sending of packet segments of the first data packet is interrupted when packet segments of a second data packet with a second, higher priority value are available in the first communication unit. In other words, while the first communication unit is sending a data packet of the first priority value, a data packet of a higher priority value that is to be sent may arrive or be present at the first, i.e., the same communication unit. In this case by using segmentation of data packets, it is possible to interrupt the sending of the first data packet and initially send the packet segments of the data packet with a higher priority. Additional recursive interruptions from messages that each have a higher priority are possible. The benefit of this may be that not only may higher priority data packets from other communication units be sent with a shorter latency, a duration until a higher priority data packet is sent to the first communication unit itself may be reduced.

In some embodiments, the segmenting is performed by means of a control unit of the first communication unit designed to control the transmission channel. For example, the data packet may be in a MAC (MAC: media access control) component of the communication unit. The MAC component may be designed to save data packets according to their priority in different queues or sending queues. According to the present embodiments, it is for example possible to segment the data packets within the queues. For example, the segmenting into packet segments is hardware-based within the MAC component. The segmenting of the packet segments may be performed within a layer 2 environment of the communication unit. The benefit of this may be that segmenting can occur efficiently without for example using processor power of the communication unit by running programs or software.

In some embodiments, the packet segments are made available to a physical layer of the communication system. The packet segments may for example be transmitted by the MAC component to the PHY component of the communication unit. For example, the physical layer, the PHY component or the PHY layer of the communication unit may be designed to establish a current access priority of the shared transmission channel. Accordingly, the PHY layer may immediately execute the sending of the particular packet segments autonomously depending on the current access priority. The benefit may be that delays between the determination of the current access priority and the sending of packet segments may be minimized.

In some embodiments, a maximum size of a packet segment can be set depending on the transmission channel and/or depending on the type of communication units of the communication system. For example, a first transmission channel may enable a faster transmission of packet segments than a second transmission channel. Accordingly, when using the first transmission channel even with larger packet segments, real-time requests may always be ensured due to the shorter transmission times. Accordingly, a maximum size of the packet segments to be sent via the first transmission channel may be chosen to be larger than when using the second transmission channel. For example, particularly time-critical communication units may be provided in a first communication system. In this case it is possible to choose the maximum size of the packet segments to be smaller, for example smaller than 32 bytes. This may yield the benefit that a sending of a message can be interrupted very quickly, for example when a data packet with a higher priority is to be sent at another communication unit. The maximum size may be chosen according to a benefit ratio. Since smaller packet segments may have control data (such as headers) of the same size as large packet segments, the ratio of information data to control data may shrink as the maximum size decreases. The smaller ratio may for example be acceptable due to a greater overall benefit, for example by weighing against real-time requests of the messages to be fulfilled. One benefit may be a potential adaptation to different requests.

In some embodiments, the packet segments are transmitted via a wired transmission channel of a local communication system. A local communication system may for example be provided in a vehicle, in a machine, an electrical system or in a house. By using a wired transmission channel, it is possible to have precise information on how many communication units are connected to the transmission channel. Beneficially, a very precise prediction of a behavior of the communication system, or respectively the communication units can therefore be possible. For example, a transmission speed and/or a bandwidth can always be constant in a wired transmission channel. Beneficially in combination with the selection of a maximum size of packet segments, a maximum latency period that may occur until sending a high priority data packet can therefore be determined.

In some embodiments, a particular segment header is added to each packet segment, wherein the segment header at least indicates when a packet segment is a first or a last packet segment of a data packet. The segment header may for example be added in an Ethernet network in addition to an Ethernet header. For example, the segment header of the first packet segment of a data packet may indicate that other packet segments of the data packet will be sent. For example, the segment header of the last packet segment of the data packet may indicate that no other packet segments will be sent, and the sending of the complete data packet is concluded. Beneficially, packet segments may thereby be more easily assigned to a particular data packet. For example, the sending of a data packet via the shared transmission channel may be delayed by being interrupted for an indefinite time. Through the segment header, it may beneficially be easier for example to determine when all packet segments of the data packet have been sent.

A exemplary second aspect corresponding to sending the data packet relates to a method for receiving a data packet at a first communication unit. The data packet is transmitted via a shared transmission channel of a communication system with the first communication unit. The method for receiving the data packet includes receiving at least one packet segment from another communication unit of the communication system. The packet segment can be a segment of a data packet that was sent by the other communication unit to the first communication unit according to the above-described method. A plurality of packet segments can be received.

The first communication unit determines a priority value of the packet segment and caches the packet segment of the other communication unit. The caching depends on the priority value of the packet segment. For example, the first communication unit has a particular cache for all used priority values of data packets. The first communication unit may for example receive a packet segment with a first priority value, wherein the packet segment may have a segment header that indicates that the packet segment is the first packet segment of a data packet. The first communication unit may assign other packet segments received by the other communication unit with the same priority to the first packet segment. By assigning packet segments to particular communication units and by caching according to priority, the packet segments may be sorted or organized according to the particular original data packets.

Finally, the first communication unit may output the data packet composed of the received packet segments after receiving all packet segments constituting the data packet. The last packet segment of the data packet may for example be identified by a corresponding segment header. The packet segments may for example be cached in a MAC component of the first communication unit or in a layer 2 environment of the first communication unit, and compiled into the original unsegmented data packet after the last packet segment has been received. For example, the packet segments may be compiled into the data packet by hardware so that beneficially, for example, no central processor power of the first communication unit is required to do this (such as by running a software program). For example, particular headers, such as headers of the packet segments, may be removed for compiling.

In some embodiments, packet segments of the data packet cached following the reception of a last-received packet segment of a data packet are deleted after a given dead time. Perhaps a communication unit may have started to send packet segments of a data packet via the shared transmission channel, but did not completely send the data packet (by sending all packet segments), for example due to an error. After a certain time that can be specified by the dead time, it may therefore be assumed that the data packet cannot be completely sent, or respectively cannot be completely received by the first communication unit. Deleting the corresponding cached packet segments may yield the benefit of making unnecessarily occupied memory in the first communication unit available again. Alternatively or in addition, cached packet segments of a data packet with the lowest priority value of all cached packet segments may be deleted if cache is scarce. The first communication unit can for example receive packet segments from a plurality of data packets. For example, initial packet segments of a low priority data packet may have been received, wherein not all packet segments of the low priority data packet were received. For example, higher priority data packets may have been received in the interim. Since the memory capacity of the first communication unit may be limited, it may be beneficial to use the limited memory to cache higher priority data packets. In order for example to enable a complete reception of a higher priority message, it may be beneficial to free up cache by deleting lower priority incomplete messages, or respectively packet segments corresponding thereto. This may yield the benefit that the reception of higher priority data packets is always preferred. The transmission of the message with a lower priority may for example be restarted at a later time.

In some embodiments, the dead time is set depending on the priority value of the data packet. For example, low priority messages may have reduced effects when they have not been completely received. A lesser dead time may therefore be selected for low priority messages than for high priority messages for which memory is for example to remain occupied even when the probability of the remaining packet segments of the high-priority message being received may be less due to a longer dead time. This may yield the benefit that cache is not occupied by packet segments with a lower priority when the probability is low that other packet segments will still be received to complete the data packet.

In some embodiments, caching packet segments of new data packets in the first communication unit is suspended when cache is scarce. For example, exclusively packet segments of such data packets are cached when other packet segments of the data packet are being cached. For example, the reception of new messages is suspended when only high-priority packet segments are cached. This may yield the benefit that data packets that have already been partially received do not have to be deleted and completely resent and received; instead, they may only be completely received until other data packets can be received.

A further exemplary aspect furthermore relates to a computer program for executing a method described above or in the following, if the computer program runs on a computer, a processor, or a programmable hardware component.

Another exemplary aspect relates to a communication unit for transmitting data packets. The transmission may relate to the sending and/or receiving of a data packet, or a plurality of data packets, via a shared transmission channel, wherein the communication unit is designed to execute one of the above methods.

The communication unit has for example a control unit that is designed to segment data packets for being sent into packet segments of a predetermined size. For example, data segmenting may be performed in a MAC component or a layer 2 environment of the communication unit. A communication unit may for example be designed for use in vehicles. Communication units may for example be microphones, sensors or control units. The benefit of using communication units according to the present aspect for example in vehicle networks with a shared transmission channel may be that a maximum latency period of high priority data packets or messages may be reduced and for example a reliability of corresponding functions may be increased.

Another exemplary aspect relates to a motor vehicle with a communication system that comprises a shared transmission channel.

The communication system has at least one proposed communication unit. The motor vehicle may be a vehicle in line with the preceding or following description. The motor vehicle may be a motorized, mobile means of transportation for transporting persons and/or goods, for example a land vehicle. The motor vehicle is for example a passenger vehicle, a truck, or a motorized two-wheeler. The motor vehicle may in particular be designed to enable autonomous, and/or partially autonomous or partially automated driving, for example by using communication units formed by sensors and/or control units. For functions of an autonomously or partially autonomously driving vehicle, it may be beneficial to minimize latency periods when transmitting data packets of a high priority by using the teachings herein.

Further embodiments of the computer program, the communication unit, and the motor vehicle comprise such that have one or more features/limitations which have been described in conjunction with the embodiments of the exemplary method described herein. For this reason, the corresponding embodiments of the computer program, the communication unit, and the motor vehicle are not again described.

In the following, further examples of the present invention will be described in greater detail with reference to the attached FIGS.

Specific references to components, process steps, and other elements are not intended to be limiting. Further, it is understood that like parts bear the same or similar reference numerals when referring to alternate FIGS. It is further noted that the FIGS. are schematic and provided for guidance to the skilled reader and are not necessarily drawn to scale. Rather, the various drawing scales, aspect ratios, and numbers of components shown in the FIGS. may be purposely distorted to make certain features or relationships easier to understand.

FIG. 1 is a schematic flow chart of an example of a priority-based method 100 for sending a data packet by using segmentation. According to the method 100, a data packet is sent from a first communication unit of a communication system via a transmission channel that is shared with at least one further communication unit. Access is provided to the communication units on the shared communication channel according to a round-robin method. The method 100 comprises determining 110 a current access priority for the shared transmission channel by the first communication unit, wherein the current access priority is directed towards data currently transmitted over the transmission channel. The method 100 furthermore comprises a segmentation 120 of the data packet into packet segments, wherein the packet segments have a priority value that corresponds to a priority value of the data packet. Finally, a sending 130 of the packet segments is performed by the first communication unit via the shared transmission channel, wherein the packet segments are sent successively depending on the priority value and the current access priority.

In one example, the method 100 is executed in a motor vehicle. For example, a first communication unit can be a radar sensor that sends messages or data packets to a control unit to execute automated driving functions of the motor vehicle, for example via a shared 10 Mbit/s Ethernet channel. A second communication unit can be a switch for opening and closing a window that also sends data to the control unit. If the switch has sent first packet segments of a message, the radar sensor can interrupt the message from the switch in order to send a message since the radar sensor can have a higher priority than the switch. For example, the switch can then send remaining packet segments of the message when the message from the radar sensor is completely sent.

For example, the first communication unit may be a microphone that must send time-critical data packets in order to ensure high audio quality. It is possible for the microphone to share a transmission channel with a control unit that sends large data packets. Through the proposed segmentation, it is possible for messages from the microphone to interrupt the long messages from the control unit, for example if the microphone has a higher priority than the control unit. A high quality of service (QoS) can for example be achieved by the segmenting and the priority-based assignment of access rights.

Figure 2:
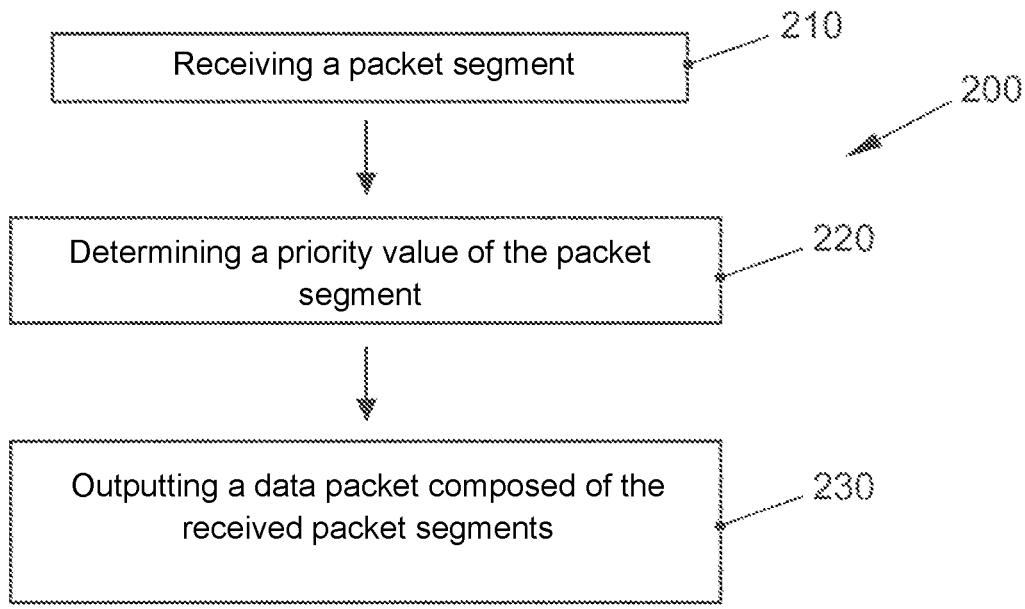
FIG. 2 shows a schematic flow chart of an example of a priority-based method for receiving a data packet by using segmentation.

FIG. 2 shows a schematic flow chart of an example of a priority-based method 200 for receiving a data packet by using segmentation. According to the method 200 for receiving a data packet at a first communication unit, the data packet is transmitted via a shared transmission channel of a communication system with the first communication unit. The method 200 comprises a reception 210 of a packet segment from another communication unit of the communication system. According to the method, a priority value of the packet segment is determined 220, and the packet segment is cached assigned to the other communication unit and depending on the priority value of the packet segment. Following the reception of all packet segments constituting the data packet, an outputting 230 occurs of the data packet composed of the received packet segments.

The methods 100, 200 can for example be used in industrial control and regulation, as well as in building automation and/or railway technology as well as in aeronautics and shipping.

It is possible to use the Ethernet networking technology, for example with a data rate of 10 Mbit/s in vehicles. In contrast to other methods, for example with data rates of 100 Mbit/s or 1 Gbit/s, a jointly used transmission channel (shared medium) can be used. This means that a maximum of one network participant may transmit on the joint transmission medium at one point in time. Some vehicle systems fall into the class of real-time systems. This means that for example error-free transmission may include not just the integrity of data such as data packets, but also the timeliness of the transmission. To ensure that the joint transmission medium is not unnecessarily blocked by a message such as a data packet that can have a lower requirement on the time behavior than other messages or data packets, a prioritization can occur when accessing the bus, for example by an access priority.

Consequently, this can allow messages with a low priority to only be transmitted when no higher priority (higher prioritized) messages are pending for transmission. When configuring the time behavior of the network (such as a maximum anticipated transmission latency), it is for example possible to take into account that the transmission of a message with a low priority and maximum permissible size has already started. Other bus access methods may perhaps not allow such a transmission on the joint transmission channel to be interrupted by another communication participant when he wishes to transmit a message with a higher priority. Consequently, according to other methods, the end of the current transmission must be waited out in order to then send a new message (for example with a high priority). The wait time that thereby arises could be reduced by exclusively transmitting comparatively small messages with a short transmission time.

Messages or data packets that are transmitted within vehicle networks are however often comparatively large. Within Ethernet-based networks, typically messages (Ethernet frames) with a size of 1500 bytes can be used to transmit larger data volumes. Within a network with a data transmission rate of 10 Mbit/s, a 1500-byte message requires about 1.2 ms to transmit. This can mean that to transmit a high priority (high prioritized) message, for example an additional wait time of at least 1.2 ms should be scheduled for the arbitration of the network.

When using the proposed method, the wait time that must be scheduled can be reduced. The proposed method can be employed for use in real-time systems since it takes into account the use of priorities. Messages of a high-priority can interrupt messages of a low priority without data loss occurring. After the interruption, the previously interrupted message can for example be continued and compiled into the original form in the receiver(s); for example, packet segments can be recompiled into data packets.

Examples of the method can be converted into an Ethernet-based system in a media access controller (MAC). For example, the Ethernet standard IEEE 802.1Q provides eight different priorities, wherein a priority 0 corresponds to the lowest priority, and a priority 7 corresponds to the highest priority. MACs with consideration of priority can possess several (typically 8) sending queues. A scheduler can ensure that the messages from the queue with the highest priority are transmitted first, and only when this queue is empty are messages transmitted from queues with a low priority. The reception of prioritized messages functions for example according to a similar principle. The MAC has access to several (typically 8) receiving queues. Once it receives a message, it can place it in the associated queue and issue a notification (typically a hardware interrupt) to a processor. Associated (software) applications then for example retrieve the data from the receiving queues. With applications having low time requirements (with which for example large communication latencies are permitted), this is done for example with a larger time delay than is the case with applications having very high time requirements (with which for example lower communication latencies are needed). The behavior of several queues can make it possible for messages with a low priority (that for example are retrieved with a larger time delay) to not be able to "clog up" the receiving queues. Since the transmission of messages with a high priority can always occur quickly, (all) the messages such as data packets are divided up into smaller segments (the packet segments) when sending according to the method described herein and recompiled in the receiver. Messages with a high priority can also be segmented according to this method since several participants in the network may wish to send with this priority, and they thereby have the same opportunity (fair behavior) to start sending the message within a certain time.

To perform the proposed method, a sender is proposed such as the communication unit for sending the data packet. The message to be sent can be located at the frontmost position of the queue with the currently highest priority. The segmentation mechanism can generate a segment header that can be sent together with a previously defined number of bytes of the message. Actual sending only occurs when the network participant receives sending access to the joint communication medium (after arbitration, for example by comparing the priority of the data packet with the current access priority). For a vehicle network with a data rate of 10 Mbit/s, for example 64 bytes is a potential segment size. The transmission time of a segment including the segment header can then be approximately 54 its. This allows for example fast control and regulation systems to also be realized. After the first segment of the message has been sent, the segmenting apparatus can generate the next segment (following segment) and also send it. Only when for example all segments of the message have been sent is the message removed from the sending queue. The last segment of a message can be shorter than the other segments of the message, except if the message is for example a precise multiple of the segment size.

According to the method, it is unnecessary for the sender to send all segments belonging to a message one directly after the other. It is for example conceivable that, at a first point in time, the message with the highest priority possesses the priority 3 and the network participant starts to send the first segments of this message. Then, however, another message may appear in the queue with the priority 4. Consequently, the participant for example first does not send any other segments of priority 3, but rather starts to send segments of the message with the priority of 4. This can also for example be interrupted when for example messages with the priority of 5 or higher arrive to be sent or appear. The previously interrupted message for example with the priority of 3 is for example only continued when no messages are in the queues of a higher priority. Beneficially, the system can be configured so that there are 8 priorities. Consequently, a recursive interruption can occur up to a depth of 7.

Figure 3:
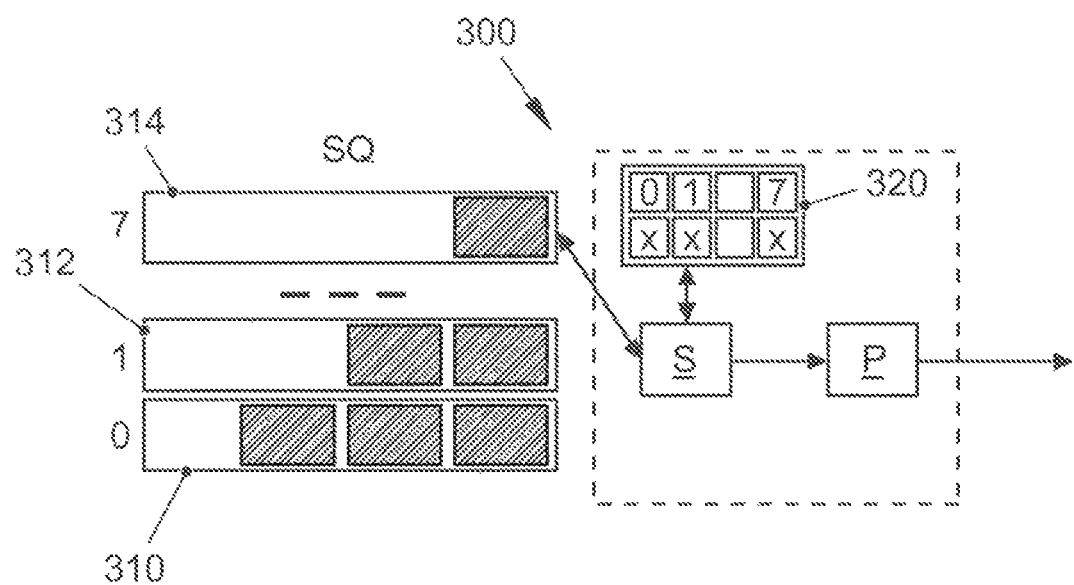
FIG. 3 shows a schematic representation of an exemplary sender for sending data packets by using segmentation.

FIG. 3 correspondingly shows a schematic representation of an example of a sender 300 for sending data packets by using segmentation. A module SQ can have up to 7 sending queues for the different message priorities (priority values of the data packets). For example, three sending queues 310, 312, 314 are provided for the respective priority values of 0, 1, or respectively 7. A component S can be configured to select the correct segment from the first element of the queue in each case with the messages of the highest priority. To accomplish this, S copies for example a predefined number of bytes from the message into a segment. A component P can be configured to complete the segment by adding a segment header. The component S must bookmark the position, for example for all messages (once per queue), (for example, the particular position can be noted or saved in a table or a memory 320) up to which the data of the message have already been segmented and sent. In the next sending process, for example the data starting from this position are sent.

Figure 4:
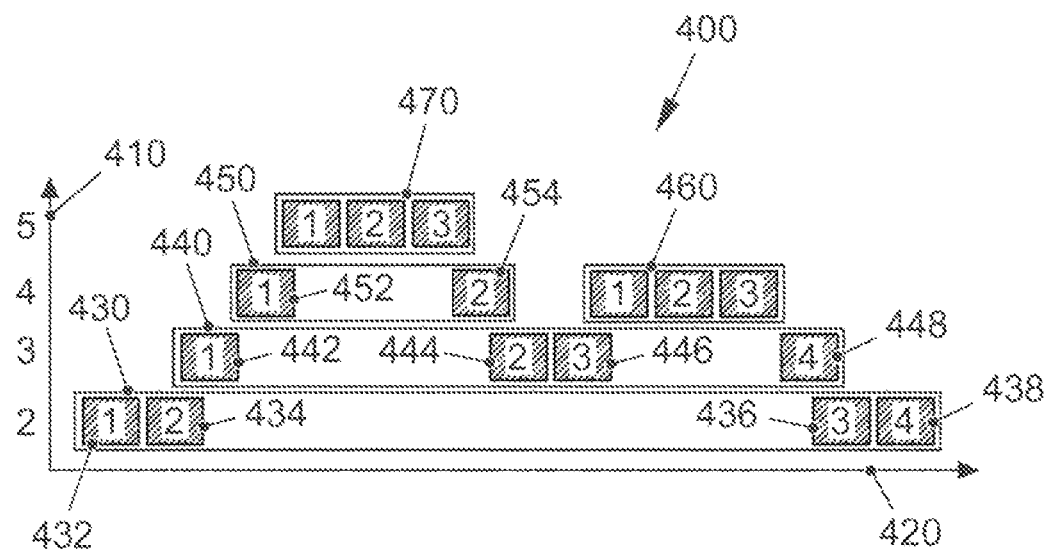
FIG. 4 shows a schematic representation of an exemplary sending protocol with segmented data packets of differing priority.

According to the method, messages of a lower priority can be interrupted by messages of a higher priority and then continued at the same point. In this regard, FIG. 4 shows a schematic representation of an example of a sending protocol 400 with segmented data packets of differing priority 410. Packet segments can be sent sequentially over time, for example arranged on a time axis 420. A first data packet 430 can have a priority of 2, a second data packet 440 can have a priority of 3, a third and a fourth data packet 450 and 460 can each have a priority of 4, and a fifth data packet 470 can have a priority of 5. For example, first two packet segments 432, 434 of the first data packet 430 may have been sent when the second data packet 440 is present for sending. For example, a first packet segment 442 of the second data packet 440 may have been sent when the third data packet 450 is present for sending. For example, a first packet segment 452 of the third data packet 450 may have been sent when the fifth data packet 470 is present for sending. In this case, data packets of a higher priority can interrupt the sending of the data packets of a lower priority. For example, the sending of the third data packet 450 can be interrupted after the sending of the first packet segment 452 until the entire fifth data packet 470 has been sent. After the complete sending of the fifth data packet 470, for example the third data packet 450 can be completed by sending a second packet segment 454. For example, the sending of the second data packet 440 can then be continued by sending a second packet segment 444 as well as a third packet segment 446.

For example, while sending the third packet segment 446, the fourth message 460 with a higher priority can be present and then interrupt the sending of the second data packet. For example, a last packet segment 448 of the second data packet 440 can be sent when the fourth data packet 460 has been completely sent. After the conclusion of sending the second data packet 440, the remaining packet segments 436, 438 of the first data packet 430 can for example be sent.

For example, a segment header can be added to the packet segments. The task of the segment header can consist of recompiling the message into the original form in the receiver. The segment header does not have for example any reference to the content of the message. Since a receiver can receive messages from several senders, it must be able to assign the sender from which a particular segment comes. Each sender has for example up to 8 sending queues. The receiver must for example know the queue, or respectively the priority to which the segment belongs. Within a queue, the sequence of the packet or data segments is unambiguous so that for example no information regarding the sequence has to be transmitted. It may be beneficial to separately mark the first segment of a message. This makes it possible for example to recognize when a message has concluded and when a new message begins. When there is for example transmission errors or a loss of synchronization, the receiver can reject all segments of a queue for example until it receives the beginning of a new message. The last segment of a message can for example also be marked. This allows the segmenting mechanism in the receiver to recognize when the message has been completely received and can be processed further. For example, a notification (such as an interrupt) is then sent to an application. The identity of the sending network participant must for example only be unambiguous within the network segment. The network-wide unambiguous addressing is achieved by the header of the message, such as an Ethernet header. Consequently, for example 10 bits are therefore sufficient to identify the sender (for 1024 possible network participants). For example, 3 bits (0 to 7) are needed to address the queue. Together with the bit that indicates whether it is an initial segment, as well as the bit that indicates whether it is the concluding segment, for example 15 bits are therefore needed for the segment header. The size of headers can for example be configured to be a multiple of 8 bits. This simplifies for example the byte-wise access to the data. For this reason, an additional bit can be introduced that for example can be sent as an indicator of future expansions. The total segment header is for example 2 bytes long.

For example, a receiver is proposed that is configured to receive packet segments that it can compose into a data packet. In a network with a jointly used communication medium, for example each participant (for example each communication unit) receives all data segments and must independently decide whether the data segment is intended for it or can be rejected. The information on the receiver(s) for which the message is intended is for example in a header of the message (for example not in a segment header). With messages in the Ethernet format, this can be the Ethernet header. According to the method described here, the receiver address may always be in the first segment of a message. With the Ethernet frame format, the receiver address occupies for example the first 6 bytes of the 18-byte large header. Consequently, segments much smaller than 64 bytes are for example also possible. First, the network participant rejects for example segments until he receives an initial segment. For example, the receiver address is extracted from the initial segment or initial frame. In the case of Ethernet addresses, this can be a unicast address (addressed precisely to one receiver), a multicast address (addressed to several receivers) or a broadcast address (addressed to all receivers). If the receiver has ascertained that the message to which the received segment belongs must be received, the segment is for example copied to an internal memory of the segmenting mechanism or the communication unit. In addition, the receiver extracts for example the sender ID as well as the queue ID from the segmenting header. In a "list of partially received messages" in an internal memory, the receiver can note for itself that it has received a part of a message with a specific sender ID and queue ID, and/or the memory sector (buffer) in which the first segment was saved. For example, references to memory sectors for other received segments can be added to the list entry. From this point in time, the receiver also evaluates all following segments (the bit for the initial segment is not set) in addition to all initial segments that are sent via the joint communication medium once the sender ID and queue ID of the previously saved values correspond. If a following segment is received that belongs to a message which is already partially received, this can also be copied to a memory segment of the receiver. The address of the memory segment is for example saved after the address of the initial segment in a "table of partially received messages". If a segment is received that has set the final segment bit, a message for example has been completely received. Then all segments of the message can be copied from the memory sector of the segmenting mechanism into a receiving queue. For example, one network participant possesses several receiving queues, for example eight-one queue for each priority class. For example, only completely received messages are copied to the queues. Subsequently, a notification (such as an interrupt) can be initiated to process the received data. Moreover, previously used memory sectors can be again released within the segmenting mechanism (for example a cache of the receiver). This relates to for example the segment buffers of all associated segments, as well as for example the entry into a "list of partially received messages". It is for example possible for messages to be small enough for them to fit in a single segment. In this case, both the bit for the initial frame as well as for the final frame can be set in the segment header. Since other segments do not have to be waited for when receiving such a segment, the message can be copied directly into the receiving queue. If the receiver receives an initial segment that contains the same sender ID and queue ID as one that is already in the "list of partially received messages", this indicates for example an error since the previous message was obviously not completely transmitted from the queue of the sender or was for example lost along the way. Since the partially transmitted message may perhaps no longer be able to be completed, all previously received corresponding segments in the receiver are for example discarded. Instead, the new initial segment can be saved. This makes it possible for example to ensure that the required memory for partially transmitted messages does not grow infinitely. The size of a message (such as an Ethernet frame) does not have to be a multiple of the maximum segment size. This means for example that the last segment of a message is smaller than the other segments. Once all segments of a message have been received, the content of all segments is for example copied into a message object in the receiving queue.

Figure 5:
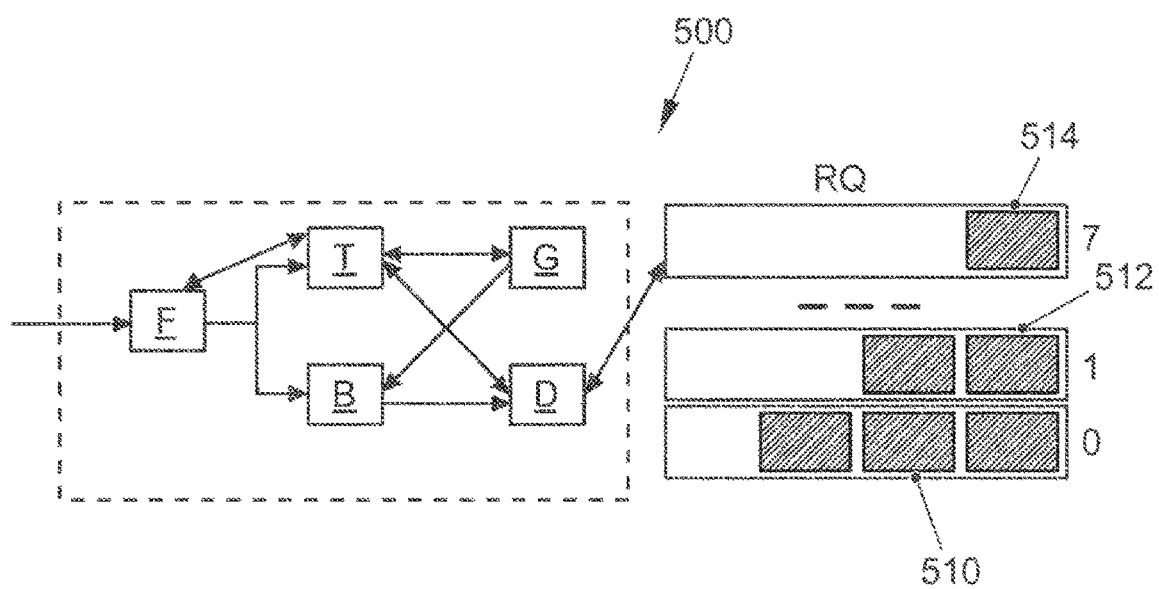
FIG. 5 shows a schematic representation of an exemplary receiver for receiving data packets by using segmentation.

FIG. 5 correspondingly shows a schematic representation of an example of a receiver 500, for example a communication unit, for receiving data packets by using segmentation. A filter F monitors for example all segments transmitted on the joint transmission medium and for example decides whether the segment is to be utilized for further processing. This can be the case with initial segments with a relevant target address for the network participant, or following segments for which there are already entries in a "table of incompletely received messages" T. In the case of an initial segment, for example a new entry is generated in the table T. The content of the segment can be written to a segment buffer B. Once all segments of a message have been received, for example a component D writes the message to a relevant receiving queue RQ. For example, three receiving queues 510, 512, 514 are provided with the respective priorities of 0, 1 and 7. A component G can check the content of the table T at regular intervals and deletes for example entries (included the data from B) that belong to dead connections.

Examples show variation and optimization options of the method, for example an adjustable maximum segment size. The size of packet segments or segments can for example deviate from a size of 64 bytes. Depending on whether the network is to be configured for maximum data throughput or minimum communication latency, it may be beneficial to adapt this value. The method is configured according to the examples such that it is possible to send segments that are smaller than the maximum segment size. This is for example the case with the final frame. The setting of the maximum segment size can therefore primarily have an influence on the sender. The receiver can for example be able to process segments of any size when using this option.

One exemplary optimization has a compatibility with unsegmented messages. This improvement provides that the receiver is able to read both segmented messages (packet segments) as well as unsegmented messages (complete data packets) from the bus or transmission channel. This can for example yield backwards compatibility to systems that do not yet support the segmenting mechanism. It is also possible for only large messages to be segmented. Small messages (smaller than or equal to the segment size) can then for example be transmitted without the additional segment header. In order to implement this expansion, it may be for example necessary for the receiver to be able to distinguish unsegmented messages from message segments. To accomplish this, for example an additional feature is needed. In order to obtain backwards compatibility, it is for example not possible to miss unsegmented messages with an additional feature. One possibility of achieving this in an Ethernet network is for example an adaptation of the Ethernet frame preamble. An Ethernet frame begins for example with a 64-bit long sequence in the form of "101010 . . . 1011". A message segment can for example begin with a different preamble. A suggestion for this is for example "10101000". This four-bit-long preamble significantly differs from that of an unsegmented standard frame.

One exemplary optimization relates to a checksum in the segment header. Transmission errors in the area of the segment header could for example be unfavorable since the data in certain circumstances could be sorted to an incorrect receiving queue. Consequently, it can be provided to additionally transmit a checksum. For methods of this kind, an 8-bit CRC can be beneficial.

One exemplary optimization relates to omitting a sender ID in the segment header. Depending on which bus access method is used, a transmission of the sender ID in the segment header may be omitted in certain circumstances. With the PLCA bus access method, for example each network participant already possesses an ID by means of which the bus access sequence is regulated. By using the point in time at which the message segment appears on the transmission medium, the network participant can for example clearly establish the other participant from which the segment is coming. In order to also be able to use this information for desegmenting (compiling the packet segments), an adaptation is provided for example of the interface between the Ethernet PHY component that controls the network access and the Ethernet MAC component that contains the segmenting mechanism described herein as well as the sending and receiving queues. The normally used interface between the PHY and MAC transmits for example only the content of the received data, but however not the position of the data within the communication cycle. Consequently, an expansion of the interface is proposed here for transmitting the position of the data within the communication cycle. This can be realized by additional bits in the data stream.

One exemplary optimization relates to considering the sender ID in the CRC without an explicit transmission. Even if the sender ID is not transmitted within the segment header, it may be beneficial to take this into account when calculating the CRC. This can allow errors in the arbitration method, in the PHY, or in the communication between the PHY and MAC to not lead to misguided segments being inserted in a wrong message.

One exemplary optimization relates to the regulation of the required memory in the receiver. The available memory in the segmentation mechanism can be limited in principle so that a lack of available memory may occur for example depending on the received data segments. In the proposed method, each network participant possesses for example eight sending queues, and for example 1023 (10 bits −1) other participants may be on the network. If each participant starts sending a large message such as 1500 bytes for each queue (corresponding to 24 segments of 64 bytes each) to everyone, the segmenting mechanism in all the receivers must be able to cache more than 12 Mbytes of data for incompletely received messages. This might be associated with high costs. Consequently, methods are proposed for getting by with significantly less memory.

Received segments of partially transmitted messages should for example be discarded as early as possible if it can be assumed that the missing part of the message will not be transmitted in order to be able to use the memory for other messages.

To accomplish this, one exemplary optimization correspondingly relates to the recognition of lost segments. An expansion of the method provides that a counter is contained in the segment header. If during the transmission individual segments are lost, this can for example be recognized by a jump >1 in the value of the counter between two adjacent segments. It must be assumed that the received message is incomplete even if a final segment is received at some point. Incompletely received messages do not need to be passed on to the next highest network levels since they may be rejected there in any case. The optimization provides deleting all received segments as well as the entry in the "list of partially received messages" once a jump of the counter value >1 is recognized.

One exemplary optimization relates to the recognition of dead connections. If a communication partner (communication unit) or a network connection fails before a message has been completely transmitted, this would cause the memory of the already received segments of a message to not be released until the next reset before a message has been completely transmitted according to the above-described method. The optimization provides recognizing such "dead connections" and releasing the blocked memory. To accomplish this, the segmenting mechanism requires for example a local time reference in order to determine the age of the last received segment and for example to release the memory when a limit value (maximum permissible age) has been exceeded. The local time reference can be realized by a local oscillator and a counter. Upon each reception of a segment, the current counter value is saved in the "list of incompletely received messages" as a "time of the last received segment". At regular intervals, the "list of incompletely received messages" can be checked to see if there are for example entries where the difference between the "time of the last received segment" and the current counter value exceeds a given value. If this is the case, for example the entry as well as all referenced segments are deleted, and the memory is released. The value (timeout) as of which a connection can be considered "dead" can be set by a register.

One exemplary optimization relates to a recognition of dead connections due to low priority (low prioritized) segments. In the previously described method, a network participant only sends segments of a message with a specific priority when there is no message in a sending queue with a higher priority. If this behavior is known to the receiver and it receives a segment for example with the priority of 4, it can for example conclude that the queues with priorities 5, 6 and 7 are empty. If entries from the same sender with this priority are in the "list of incompletely received messages", it can be assumed that these messages will not be completed. The optimization provides deleting these entries from the list and releasing the associated memory of all previously received segments.

One exemplary optimization relates to a queue-dependent timeout. In real-time systems, messages with a very short permissible communication latency are assigned to a queue with a high priority (such as 7), and messages with a very long permissible communication latency are assigned to a queue with a lower priority. With messages that are intended for a queue with a high priority (information is for example in the segment header), the permissible wait period for recognizing a dead connection can be chosen to be much shorter than is the case with messages that are still valid after a long wait period. Consequently, it may be beneficial to be able to individually set the timeout value for each queue (typically 7). This allows memory to for example be released earlier.

One exemplary optimization relates to a refusal of new messages when memory is scarce. After memory has been released, the normal way is to completely receive a message and transmit the data to the next protocol layer (via the reception queue). The aim of the optimization when memory is getting low is not to use any memory for new messages (initial segment), but rather to only attempt concluding already started messages. For this purpose, a threshold is set. Once the amount of the allocated memory has exceeded this value, all initial segments are ignored for example by the segmenting mechanism, and only following and final segments of messages that have already started are processed.

One exemplary optimization relates to an interruption of connections with low priority when memory is scarce. Messages that are transmitted using a queue with a low priority allow for example an additional delay (communication latency). It is therefore sometimes possible for such messages to interrupt the transmission in the event that the receiver is overloaded and repeat the transmission at a later point in time. With messages that only permit a very short communication latency, this is for example impossible. The optimization therefore provides that segments from low priority messages can be deleted, for example when the available memory is insufficient for completely receiving a high priority message. This measure is for example employed when the available memory is actually entirely used up. By deleting partially received messages, for example free memory is created for several new segments. The incomplete message with the lowest priority can then be deleted. If several messages with the same low priority exist and the "time of the last received segment" is known, the message can be deleted whose time is the oldest. The probability is minimal that this message will be soon completed.

Further exemplary embodiments are computer programs for executing at least one of the above-described methods, if the computer program runs on a computer, a processor, or a programmable hardware component. Depending on specific implementation requirements, exemplary embodiments can be implemented in hardware or in software. The implementation can be performed using a digital storage medium such as a floppy disk, DVD, Blu-ray disc, CD, ROM, PROM, EPROM, EEPROM or flash memory, hard disk, or another magnetic or optical memory on which electronically-readable control signals are saved that interact or can interact with a programmable hardware component so that the respective method is performed.

A programmable hardware component can be formed by a processor, a computer processor (CPU=central processing unit), a graphics processor (GPU=graphics processing unit), a computer, a computer system, an application-specific integrated circuit (ASIC), an integrated circuit (IC), a single chip system (SOC=system-on-a-chip), a programmable logic element or a field-programmable gate array with a microprocessor (FPGA=field-programmable gate array).

The digital storage medium can therefore be machine or computer-readable. Several exemplary embodiments therefore comprise a data carrier that has electronically-readable control signals which are capable of interacting with a programmable computer system or a programmable hardware component such that one of the methods described herein is performed. An exemplary embodiment is accordingly a data carrier (or a digital storage medium or a computer-readable medium) on which the program for performing one of the methods described herein is recorded.

In general, exemplary embodiments may be implemented as a program, firmware, computer program or computer program product with a program code or as data, wherein the program code or the data is, or respectively are effective in performing one of the methods when the program runs on a processor or a programmable hardware component. The program code or the data can for example also be saved on a machine-readable carrier or data carrier. The program code or the data can inter alia exist as source code, machine code or byte code as well as another intermediate code.

The above-described exemplary embodiments merely represent an illustration of the principles of the present invention. Of course, modifications and variations of the arrangements and details described herein are apparent to other persons skilled in the art. It is therefore intended that the invention is only restricted by the scope of protection of the following claims, and not by the specific details which were presented herein with reference to the description and the explanation of the exemplary embodiments.

LIST OF REFERENCE NUMERALS

100 Method for sending a data packet
110 Determining an access priority

120 Segmenting of the data packet
130 Sending the packet segments
200 Method for receiving a data packet
210 Receiving a packet segment
220 Determining a priority value
230 Outputting of a data packet
300 Sender
310 First sending queue
312 Second sending queue
314 Third sending queue
320 Memory
400 Sending protocol
410 Priority
420 Time axis
430 First data packet
432, 434, 436, 438 Packet segments of the first data packet
440 Second data packet
442, 444, 446, 448 Packet segments of the second data packet
450 Third data packet
452, 454 Packet segments of the third data packet
460 Fourth data packet
470 Fifth data packet
500 Receiver
510 First receiving queue
512 Second receiving queue
514 Third receiving queue The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims. The term "exemplary" used throughout the specification means "serving as an example, instance, or exemplification" and does not mean "preferred" or "having advantages" over other embodiments.

The mere fact that certain measures are recited in mutually different dependent claims or embodiments does not indicate that a combination of these measures cannot be used to advantage. Any reference signs in the claims should not be construed as limiting the scope.

What is claimed is:

1. A method for sending a first data packet from a first communication unit of a communication system via a transmission channel that is shared by a plurality of communications units including the first communication unit, the method comprising:
maintaining multiple sending queues having different priority levels;
determining a current access priority level for the shared transmission channel by the first communication unit, wherein the current access priority level is defined by a priority of data currently transmitted over the transmission channel;
segmenting the first data packet into a plurality of first packet segments, wherein the first packet segments have a first priority level which corresponds to a priority level of the first data packet;
storing the first packet segments of the first data packet in a respective sending queue, selected from the multiple sending queues, assigned to the first priority level; and
sending the first packet segments from the first communication unit via the shared transmission channel according to a priority-based scheduling protocol including:
(a) if the first priority level exceeds the current access priority level, interrupting sending of the data currently transmitted over the transmission channel and transmitting the first packet segments in a sequential manner;
(b) if the first priority level of the first packet segments is equal to the current access priority level, sending the first packet segments in an alternating round-robin manner with the data currently transmitted over the transmission channel; and
(c) if the first priority level of the first packet segments is less than the current access priority level, queuing the first packet segments until the current access priority level drops to a level equal to or below the first priority level.

2. The method of claim 1, comprising interrupting the sending of the first data packet segments when the current access priority level changes to a level exceeding the first priority level of the first packet segments.

3. The method of claim 2, wherein the segmenting is performed by a control unit of the first communication unit configured to control the transmission channel.

4. The method of claim 2, wherein a maximum size of a packet segment is set depending on one or more of the transmission channel and the type of communication units of the communication system.

5. The method of claim 1, comprising interrupting the sending of first packet segments of the first data packet when packet segments of a second data packet with a higher second priority level become available in the first communication unit.

6. The method of claim 5, wherein the segmenting is performed by a control unit of the first communication unit configured to control the transmission channel.

7. The method of claim 5, wherein a maximum size of a packet segment is set depending on one or more of the transmission channel and the type of communication units of the communication system.

8. The method of claim 1, wherein the segmenting is performed by a control unit of the first communication unit configured to control the transmission channel.

9. The method of claim 1, wherein a maximum size of a packet segment is set depending on one or more of the transmission channel and the type of communication units of the communication system.

10. The method of claim 1, wherein the first packet segments are transmitted via a wired transmission channel of a local communication system.

11. The method of claim 1, wherein the first packet segments are provided to a physical layer of the communication system.

12. The method of claim 1, wherein a segment header is added to each first packet segment, wherein the segment header at least indicates a first or a last packet segment of the data packet.

13. A non-transitory medium with instructions that cause a computer, a processor, or a programmable hardware component to conduct the method of claim 1.

14. A communication unit for transmitting a data packet via a shared transmission channel, wherein the communication unit is configured to perform the method of claim 1.

15. A motor vehicle with a communication system that comprises a shared transmission channel, wherein the communication system has at least one communication unit of claim 14.

16. A first communication unit configured to transmit a communicating of a communication system, wherein the first data packet via a shared transmission channel of a communication system, the shared transmission channel shared by a plurality of communications units including the first communication unit, the first communication unit comprising:

memory including multiple data packet segment queues having different priority levels;

a processor configured to:

determine a current access priority level for the shared transmission channel by the first communication unit, wherein the current access priority level is defined by a priority of data currently transmitted over the transmission channel;

segment the first data packet into a plurality of first packet segments, wherein the first packet segments have a first priority level which corresponds to a priority level of the first data packet;

store the first packet segments of the first data packet in the memory in a data packet segment, selected from the multiple sending queues, assigned to the first priority level; and send the first packet segments from the first communication unit via the shared transmission channel according to a priority-based scheduling protocol wherein:

(a) if the first priority level exceeds the current access priority level, interrupting sending of the data currently transmitted over the transmission channel and transmitting the first packet segments in a sequential manner;

(b) if the first priority level of the first packet segments is equal to the current access priority level, sending the first packet segments in an alternating round-robin manner with the data currently transmitted over the transmission channel; and (c) if the first priority level of the first packet segments is less than the current access priority level, queuing the first packet segments until the current access priority level drops to a level equal to or below the first priority level.

* * * * *